US012267500B2

(12) United States Patent
Lim

(10) Patent No.: US 12,267,500 B2
(45) Date of Patent: Apr. 1, 2025

(54) STORAGE OF EVC DECODER CONFIGURATION INFORMATION

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/351,219

(22) Filed: Jul. 12, 2023

(65) Prior Publication Data

US 2023/0353747 A1    Nov. 2, 2023

Related U.S. Application Data

(63) Continuation of application No. 17/103,634, filed on Nov. 24, 2020, now Pat. No. 11,716,474.

(60) Provisional application No. 63/042,756, filed on Jun. 23, 2020, provisional application No. 63/007,721, filed on Apr. 9, 2020, provisional application No. 62/956,516, filed on Jan. 2, 2020.

(51) Int. Cl.
| | | |
|---|---|---|
| *H04N 7/12* | (2006.01) | |
| *H04L 65/70* | (2022.01) | |
| *H04N 19/132* | (2014.01) | |
| *H04N 19/169* | (2014.01) | |
| *H04N 19/172* | (2014.01) | |
| *H04N 19/46* | (2014.01) | |

(52) U.S. Cl.
CPC .......... *H04N 19/132* (2014.11); *H04L 65/70* (2022.05); *H04N 19/172* (2014.11); *H04N 19/188* (2014.11); *H04N 19/46* (2014.11)

(58) Field of Classification Search
CPC .. H04N 19/132; H04N 19/172; H04N 19/188; H04N 19/46; H04N 19/70; H04L 65/70; H04L 65/61; H04L 65/762; H04L 65/764
See application file for complete search history.

(56) References Cited

U.S. PATENT DOCUMENTS

| | | | |
|---|---|---|---|
| 9,031,138 B1 * | 5/2015 | Lewis .................... | H04N 19/70 375/240.26 |
| 10,341,648 B1 * | 7/2019 | Fonte ..................... | G06T 13/80 |
| 2004/0006575 A1 | 1/2004 | Visharam | |

(Continued)

FOREIGN PATENT DOCUMENTS

EP            2810433 A1     12/2014

OTHER PUBLICATIONS

Extended European Search Report issued Feb. 28, 2024 regarding Application No. 20911025.3, 13 pages.

(Continued)

*Primary Examiner* — Gims S Philippe

(57) ABSTRACT

A decoding device and an encoding device for storage of EVC decoder configuration information are disclosed. The decoding device includes a communication interface and a processor operably coupled to the communication interface. The communication interface receives a compressed bitstream. The processor identifies a frame width value and a frame height value in a video decoder configuration record in combination with an SPS_in_stream value; and decodes the compressed video bitstream based on the frame width value and frame height value.

20 Claims, 7 Drawing Sheets

(56) References Cited

U.S. PATENT DOCUMENTS

| | | | |
|---|---|---|---|
| 2008/0095230 A1 | 4/2008 | Hannuksela | |
| 2013/0195205 A1 | 8/2013 | Wang | |
| 2013/0287366 A1 | 10/2013 | Wang | |
| 2014/0348224 A1 | 11/2014 | Ali | |
| 2015/0016551 A1 | 1/2015 | Esenlik | |
| 2016/0234522 A1 | 8/2016 | Lu | |
| 2016/0381400 A1 | 12/2016 | Hwang | |
| 2018/0338146 A1* | 11/2018 | John | H04N 19/112 |
| 2019/0012531 A1* | 1/2019 | Radwin | G06T 7/251 |
| 2019/0014337 A1 | 1/2019 | Skupin | |
| 2019/0327425 A1* | 10/2019 | Kobayashi | H04N 19/172 |
| 2020/0236403 A1 | 7/2020 | Choi | |
| 2020/0294319 A1* | 9/2020 | Peters | G06F 30/17 |
| 2021/0105492 A1 | 4/2021 | Aksu | |
| 2021/0136418 A1 | 5/2021 | Choi | |

OTHER PUBLICATIONS

International Search Report and Written Opinion of the International Searching Authority dated Apr. 5, 2021 in connection with International Application No. PCT/KR2020/019285, 9 pages.

Qualcomm et al., "Feasibility Study on 5G Video Codec Characteristics," 3GPP TSG SA Meeting #87-e, SP-200052, Mar. 2020, 4 pages.

Lim et al., "(39.1) Proposed update of WD on Carriage of EVC in MPEG Systems," ISO/IEC JTC1/SC 29/WG 11, m53629, Apr. 2020, 18 pages.

Bouazizi et al., "Proposal for EVC File Format," ISO/IEC JTC1/SC 29/WG 11 MPEG2020/m52468, Jan. 2020, 18 pages.

"Information technology—Coding of audio-visual objects—Part 15: Carriage of network abstraction layer (NAL) unit structured video in the ISO base media file format—Amendment 2: Carriage of VVC and EVC in ISOBMFF," ISO/IEC JTC1/SC 29/WG 11, ISO/IEC 14496-15:2019(E) Amendment 2, May 2020, 57 pages.

"Text of ISO/IEC CD 23094-1, Essential Video Coding", ISO/IEC JTC1/SC29/WG11, N18568, Jul. 2019, 292 pages.

Partial Supplementary European Search Report issued Dec. 7, 2023 regarding Application No. 20911025.3, 16 pages.

He et al., "AHG12: On picture and sub-picture signaling", Joint Video Experts Team (JVET) of ITU-T SG 16 WP 3 and ISO/IEC JTC 1/SC 29/WG 11, JVET-O0182r1, Jul. 2019, 6 pages.

Bross et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 2019, 455 pages.

\* cited by examiner

STORAGE OF EVC DECODER CONFIGURATION INFORMATION

CROSS-REFERENCE TO RELATED APPLICATION AND CLAIM OF PRIORITY

This application is a continuation of U.S. patent application Ser. No. 17/103,634, filed on Nov. 24, 2020, which claims priority under 35 U.S.C. § 119 (e) to U.S. Provisional Patent Application No. 62/956,516 filed on Jan. 2, 2020; U.S. Provisional Patent Application No. 63/007,721 filed on Apr. 9, 2020; and U.S. Provisional Patent Application No. 63/042,756 filed on Jun. 23, 2020. The above-identified provisional patent applications are hereby incorporated by reference in its entirety.

TECHNICAL FIELD

This disclosure relates generally to compression and coding of multimedia data. More specifically, this disclosure relates to an apparatus and a method for storage of essential video codec (EVC) decoder configuration information.

BACKGROUND

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included a given device is increasing. Even with the increase of processing power portable electronic devices often struggle to provide the processing capabilities to handle new services and applications, as newer services and applications often require more resources that is included in a portable electronic device. Improved methods and apparatus for configuring and deploying media processing in the network is required.

SUMMARY

This disclosure provides storage of EVC decoder configuration information.

In one embodiment, a decoding device for storage of EVC decoder configuration information is provided. The decoding device includes a communication interface and a processor operably coupled to the communication interface. The communication interface configured to receive a compressed bitstream. The processor configured to identify a frame width value and a frame height value in a video decoder configuration record in combination with an sequence parameter set (SPS)_in_stream value; and decode the compressed video bitstream based on the frame width value and frame height value.

In another embodiment, an encoding device for storing EVC decoder configuration information is provided. The encoding device includes a processor and a communication interface operably coupled to the processor. The processor is configured to read a video bitstream; parse SPS information in the video bitstreams; generate a video decoder configuration record used in combination with an SPS_in_stream value to identify a frame width value and a frame height value; and compress the video bitstream including the video decoder configuration record. The communication interface is configured to transmit the compressed video bitstream.

In another embodiment, an encoding device for storing EVC decoder configuration information is provided. The encoding device includes a processor and a communication interface operably coupled to the processor. The processor is configured to read a video bitstream; parse network abstraction layer (NAL) units in the video bitstream; read a value of temporal identification (temporal ID) of each NAL unit; create sub-samples according to the value of the temporal ID for each NAL unit; and compress the video bitstream with the sub-samples. The communication interface is configured to transmit the compressed video bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
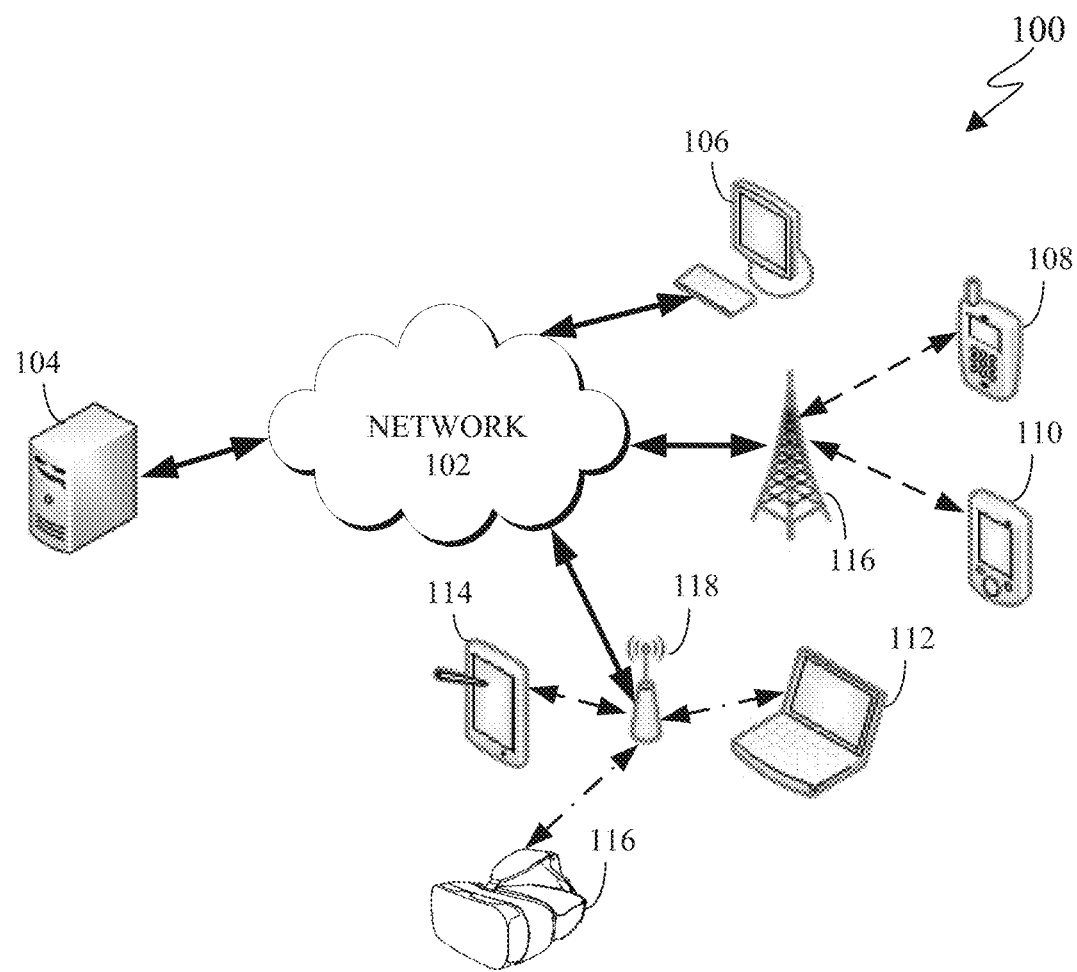
FIG. 1 illustrates an example communication system in accordance with an embodiment of this disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The EVC standard, developed by the ISO/IEC JTC 1/SC 29/WG 11 (MPEG), offers an efficient and low complexity video coding solution. EVC elementary streams are structured as network abstraction layer (NAL) units and their storage in the International Organization for Standardization (ISO) base media file format follows similar principles as other NAL structured video formats. Specific standards ISO/IEC 23094-1 "Essential Video Coding" and ISO/IEC 14496-15 "Carriage of network abstraction layer (NAL) unit structured video in the ISO base media file format" are hereby incorporated by reference in their entirety. The standard defining storage of video codec bitstream in ISO base media file format files does not support EVC. EVC-DecoderConfigurationRecord is defined to provide information to properly configure when the decoder is instantiated by providing whether the maximum value of the picture width and height is signaled through this configuration record and actual value of maximum value of the picture width and height when they are signaled.

The storage of EVC elementary streams is subdivided into two parts, which include static information that is globally used in the elementary stream and dynamic information that may vary per sample. The sequence parameter set (SPS) and picture parameter set (PPS) are considered to be part of the information that rarely changes and considered to be static. A set of flags are used to indicate if the parameter sets are expected to change in the stream. In such cases, a sample grouping is defined that indicates the samples at which the parameter sets do change.

The adaptation parameter set (APS) is considered to be dynamic information that may change on a per sample basis. The APS is used to carry the adaptive loop filter (ALF) information and dynamic range adjustment (DRA) information. Usage of ALF or DRA to process samples of video data is signaled by a flag and referred APS identification in the slice header for ALF and in the picture parameters header for DRA.

The standard defining storage of video codec bitstream in ISO base media file format files does not support EVC. Embodiments of the present disclosure provide systems and methods for storage of EVC decoder configuration information. Storing an indication to determine where EVC decoder configuration information is stored in the metadata improves transmissions for EVC media content. For example, the transmission of a bitstream can be improved by storing EVC decoder configuration information related to a length of the NAL units as well as parameter sets, if stored in a sample entry.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, including EVC decoder configuration information, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to store EVC decoder configuration information, generate a bitstream that includes the EVC decoder configuration information, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can read a video bitstream, parse the video bitstream for SPS information, generate a video decoder configuration record, compress the video bitstream, transmit the compressed video bitstream, receive the compressed video bitstream, identify a frame width value and a frame height value, and decode the compressed video bitstream, or a combination thereof. For example, the server 104 can compress a video bitstream and then transmit the video bitstream to one or more of the client devices 106-116. For another example, one of the client devices 106-116 can compress a video bitstream and then transmit the video bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
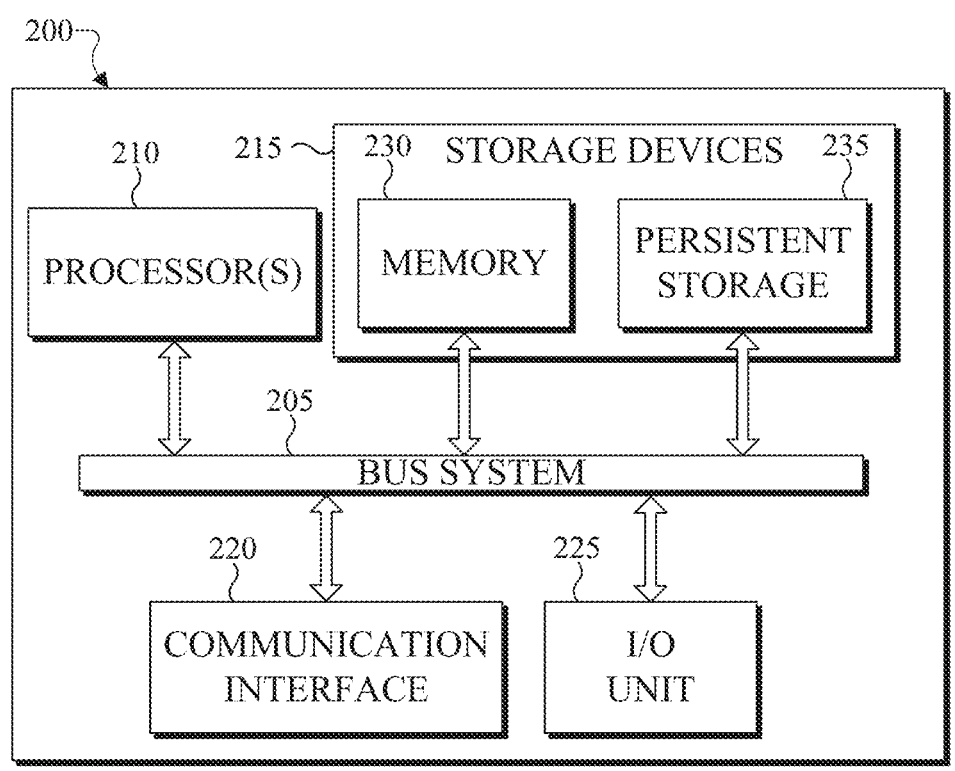
FIGS. 2 and 3 illustrate example electronic devices in accordance with an embodiment of this disclosure.
Figure 3:
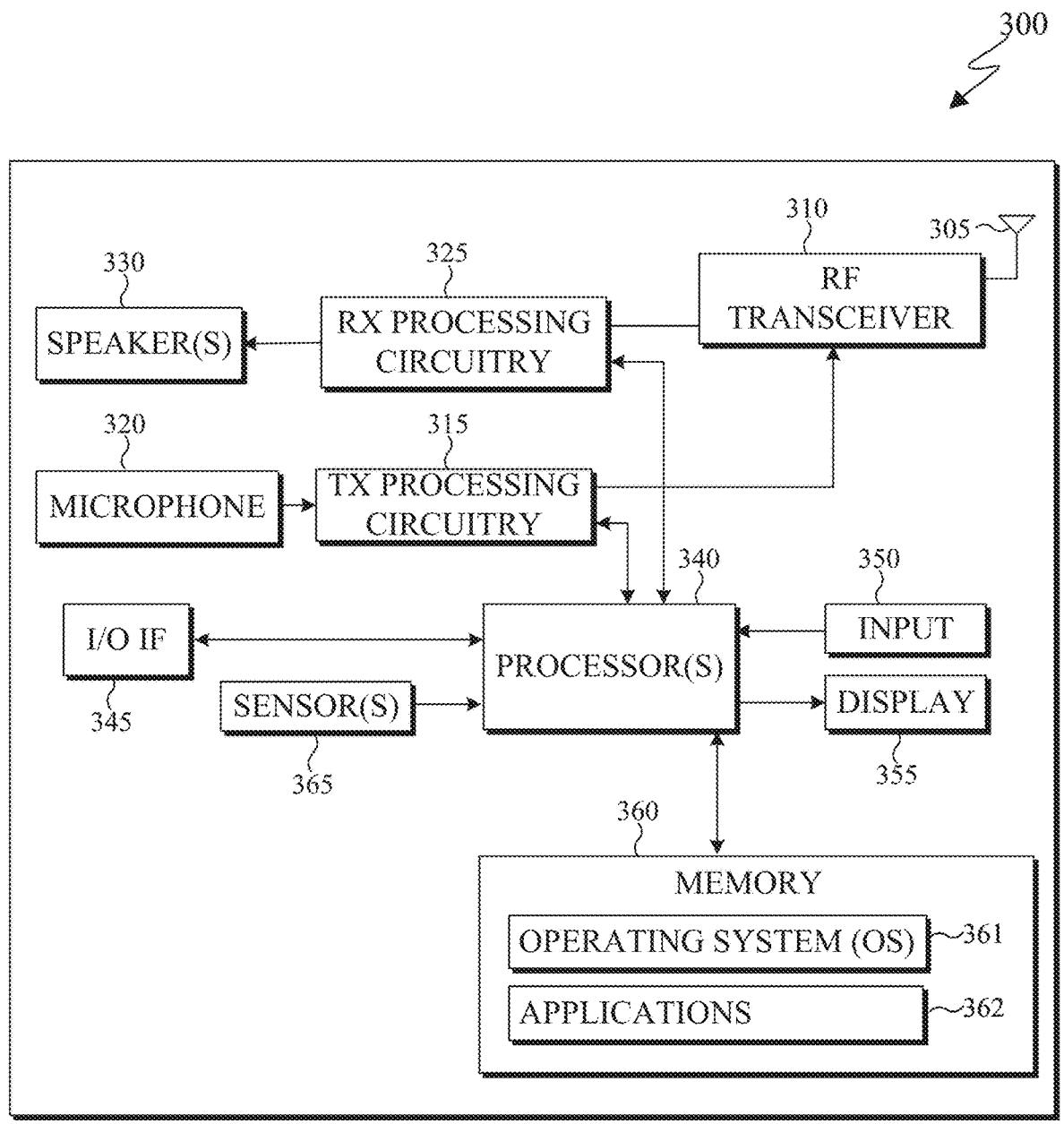

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode EVC decoder configuration information in a bitstream.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for parse the video bitstream for SPS information, instructions for generate a video decoder configuration record, compress the video bitstream, as well as instructions for transmit the compressed video bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing EVC decoder configuration information to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116.

For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

Figure 4:
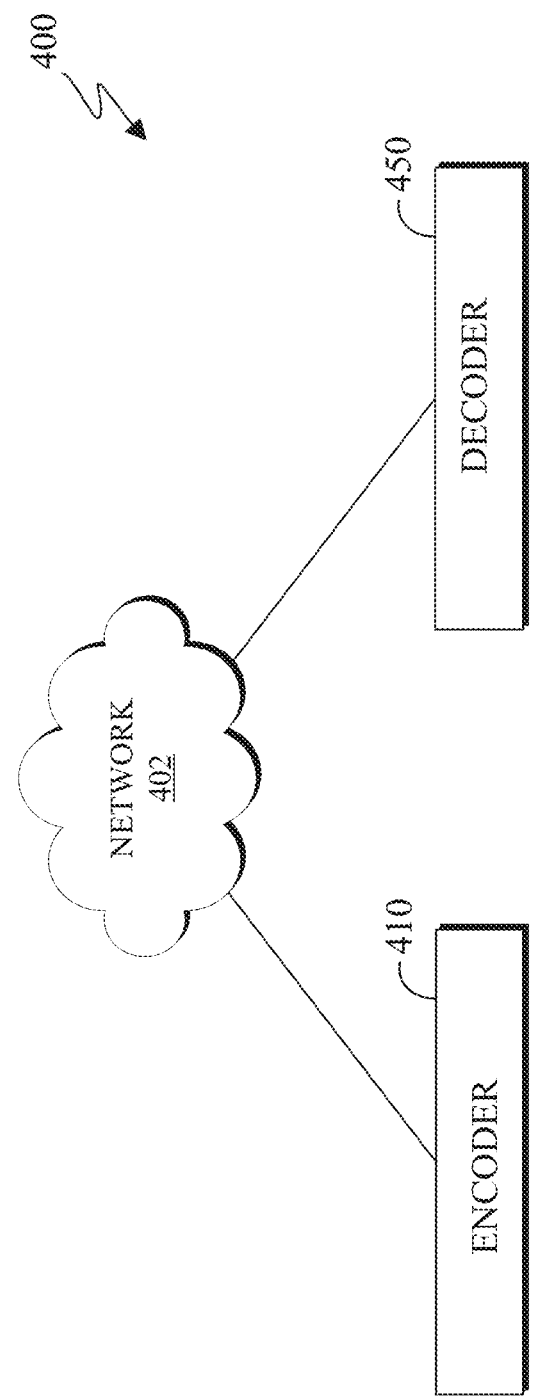
FIG. 4 illustrates a block diagram of an example environment architecture in accordance with an embodiment of this disclosure.

The electronic device 300 can create media content such as generating a virtual object or capture (or record) content through a camera. To transmit the media content to another device, the electronic device 300 can compress and encode the content. When preparing the media content to be transmitted, the electronic device 300 can include metadata for storage of EVC decoder configuration information. FIG. 4, which is described in greater detail below, illustrates a bitstream with storage of EVC decoder configuration information.

During the encoding process additional content such as metadata including storage of EVC decoder configuration information, flags, occupancy maps, auxiliary information, and the like can be included in the bitstream. The electronic device 300 can encode the media content to generate a bitstream, such that the bitstream can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream, the electronic device 300 decodes the EVC decoder configuration information stored in the bitstream. In certain embodiments, the decoded bitstream also includes an occupancy map. The decoded bitstream can also include one or more flags, or quantization parameter size, auxiliary information, or any combination thereof.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIG. 4 illustrates a block diagram of an example environment-architecture 400 for storage of EVC decoder configuration information in accordance with an embodiment of this disclosure. The embodiment of FIG. 4 is for illustration only. Other embodiments can be used without departing from the scope of this disclosure.

As shown in FIG. 4, the example environment-architecture 400 includes an encoder 410 and a decoder 450 in communication over a network 402. The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository (not shown) that contains media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, or another suitable device. The encoder 410 and the decoder 450 can include internal components similar to the server 200 of FIG. 2 and electronic device 300 of FIG. 3. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The encoder 410 receives media content from another device such as a server (similar to the server 104 of FIG. 1, the server 200 of FIG. 2) or an information repository (such as a database). The encoder 410 transmits frames representing the media content as an encoded bitstream. The bitstream can be transmitted to an information repository (such as a database) or an electronic device that includes a decoder (such as the decoder 450), or the decoder 450 itself through the network 402.

The decoder 450 can receive a bitstream that represents media content. The bitstreams can include data representing EVC decoder configuration information. In certain embodiments, the decoder 450 can decode the bitstream that includes the multiple frames and auxiliary information that are used when reconstructing the media content. The EVC decoder configuration information associated with one frame can indicate that the decoder is to reference auxiliary information from another frame when reconstructing the media content.

In an embodiment, the following subclause specifies the decoder configuration information for ISO/IEC 23094-1 video content. The length field used in each sample to indicate the length of its contained NAL units as well as the parameter sets, if stored in the sample entry.

```
Syntax
aligned(8) class EVCDecoderConfigurationRecord {
  unsigned int(8) configuration Version = 1;
  unsigned int(8) profile_idc;
  unsigned int(8) level_idc; unsigned int(32)
    toolset_idc;
    unsigned int(2) chroma_format_idc; unsigned
    int(3) bit_depth_luma_minus8;
    unsigned int(3) bit_depth_chroma_minus8;
    unsigned int(32) pic_width_in_luma_samples;
    unsigned int(32) pic_height_in_luma_samples;
    unsidned int(5) reserved = '00000'b;
    unsigned int(1) sps_in_stream; unsigned int(1)
    pps_in_stream;
    unsigned int(1) aps_in_stream; unsigned int(8)
    numOfArrays; for (j=0; j < numOfArrays; j++) {
      bit(2) reserved = '00'b;
      unsigned int(6) NAL_unit_type; unsigned
      int(16) numNalus;
      for (i=0; i< numNalus; i++) { unsigned
        int(16) nalUnitLength;
        bit(8*nalUnitLength) nalUnit;
      }
    }
}
```

Where profile_idc, level_idc, toolset_idc, chroma_format_idc, toolset_idc, bit_depth_luma_minus8 and bit_depth_chroma_minus8 contain the matching values for the fields in the PPS for all parameter sets of the configuration record. The pic_width_in_luma_samples is a variable that defines a maximum width of a frame and pic_height_in_luma_samples is a variable that defines a maximum height of a frame. The sps_in_stream indicates that the stream may contain additional SPS, that are not included in the array of NAL units of this configuration record. The pps_in_stream indicates that the stream may contain additional PPS, that are not included in the array of NAL units of this configuration record. The aps_in_stream indicates that the stream may contain additional APS, that are not included in the array of NAL units of this configuration record. The numArrays indicates the number of arrays of NAL units of the indicated type(s). The NAL_unit_type indicates the type of the NAL units in the following array (which the NAL units are all of that type), takes a value as defined in ISO/IEC 23094-1, and is restricted to take one of the values indicating a SPS, PPS, APS, or SEI NAL unit. The numNalus indicates the number of NAL units of the indicated type included in the configuration record for the stream to which this configuration record applies. The nalUnitLength indicates the length in bytes of the NAL unit. The nalUnit contains an SPS, PPS. APS or a SEI NAL unit, as specified in ISO/IEC 23094-1.

The pic_width_in_luma_samples and pic_height_in_luma_samples are used to determine a maximum frame size for a frame in the compressed bitstream. The pic_width_in_luma_samples and pic_height_in_luma_samples contain the largest values for the fields in all SPS of this configuration record when the value of the sps_in_stream field is '0'. pic_width_in_luma_samples and pic_height_in_luma_samples contain the largest values for the fields in all SPS of this configuration record and all SPS in the stream when the value of the sps_in_stream field is '1'. The value '0' can be used in the pic_width_in_luma_samples and the pic_height_in_luma_samples if the largest value of these fields in the SPS for all the parameter sets in this record is not indicated through this field when the value of the sps_in_stream field is 'O' or the value of these fields in the SPS in the stream has the value larger than the largest value of the field in this record when the value of the sps_in_stream field is '1'.

The encoder 410 can also determine sync samples for the compressed bitstream to the decoder 450. A sync sample in 'evc1' tracks can contain VCL NAL units whose NALUnitType is IDR_NUT and an SPS and a PPS to be used in such NAL units if they are not stored in the sample entry of the same track that contains such NAL units. Table 1 indicates the mapping between EVC VCL NAL unit types, ISOBMFF sync sample status and SAP types as documented in ISO/IEC 14496-12.

| NAL Unit Type | ISOBMFF sync sample status | DASH SAP type |
|---|---|---|
| IDR_NUT | true | 10 OR 3 |

For the use of the SubSampleInformationBox (8.7.7 of ISO/IEC 14496-12) in a EVC stream, a sub-sample is defined on the basis of the value of the flags field of the sub-sample information box as specified below. The presence of this box is optional; however, if present in a track containing EVC data, the 'codec_specific_parameters' field in the box can have the semantics defined here. The flag specifies a type of sub-sample information given in this box. A flag of 0 indicates NAL-unit-based sub-samples, where a sub-sample contains one or more continuous NAL units. A flag of 1 indicates tile-based sub-samples, where a sub-sample contains the VCL NAL units with all CTUs of one tile together with any associated non-VCL NAL units, if any exist. A flag of 2 indicates slice-based sub-samples, where a sub-sample contains one slice (i.e., one VCL NAL unit) and the associated non-VCL NAL units, if any other values of flags are reserved. A flag of 3 indicates a temporal ID-based sub-sample, where a sub-sample contains all VCL NAL units which has same TemporalId value with any associated non-VCL NAL units, if any exist.

The subsample_priority field can be set to a value in accordance with the specification of this field in ISO/IEC 14496-12. The discardable field can be set to 1 only if a sample would still be decodable if a sub-sample is discarded (e.g. the sub-sample consists of an SEI NAL unit). When a first byte of a NAL unit is included in a sub-sample, the preceding length field can also be included in the same sub-sample. The codec_specific_parameters field of the SubSampleInformationBox is defined for EVC as follows:
  if (flags==1){
  unsigned int(16) tile_col_idx; unsigned int(16) tile_row_idx;
  }
  else if (flags==3){
  unsigned int(3) TemporalId bit(13) reserved=0;
  }
where tile_col_idx for sub-samples based on tiles, this parameter indicates the 0-based index of the tile column that contains the tile of this sub-sample. The tile_row_idx for sub-samples based on tiles, this parameter indicates the 0-based index of the tile row that contains the tile of this sub-sample. The TemporalId for sub-samples is based on Temporal ID, this parameter indicates the TemporalID of the all VCL NAL units in the sub-sample.

Figure 5:
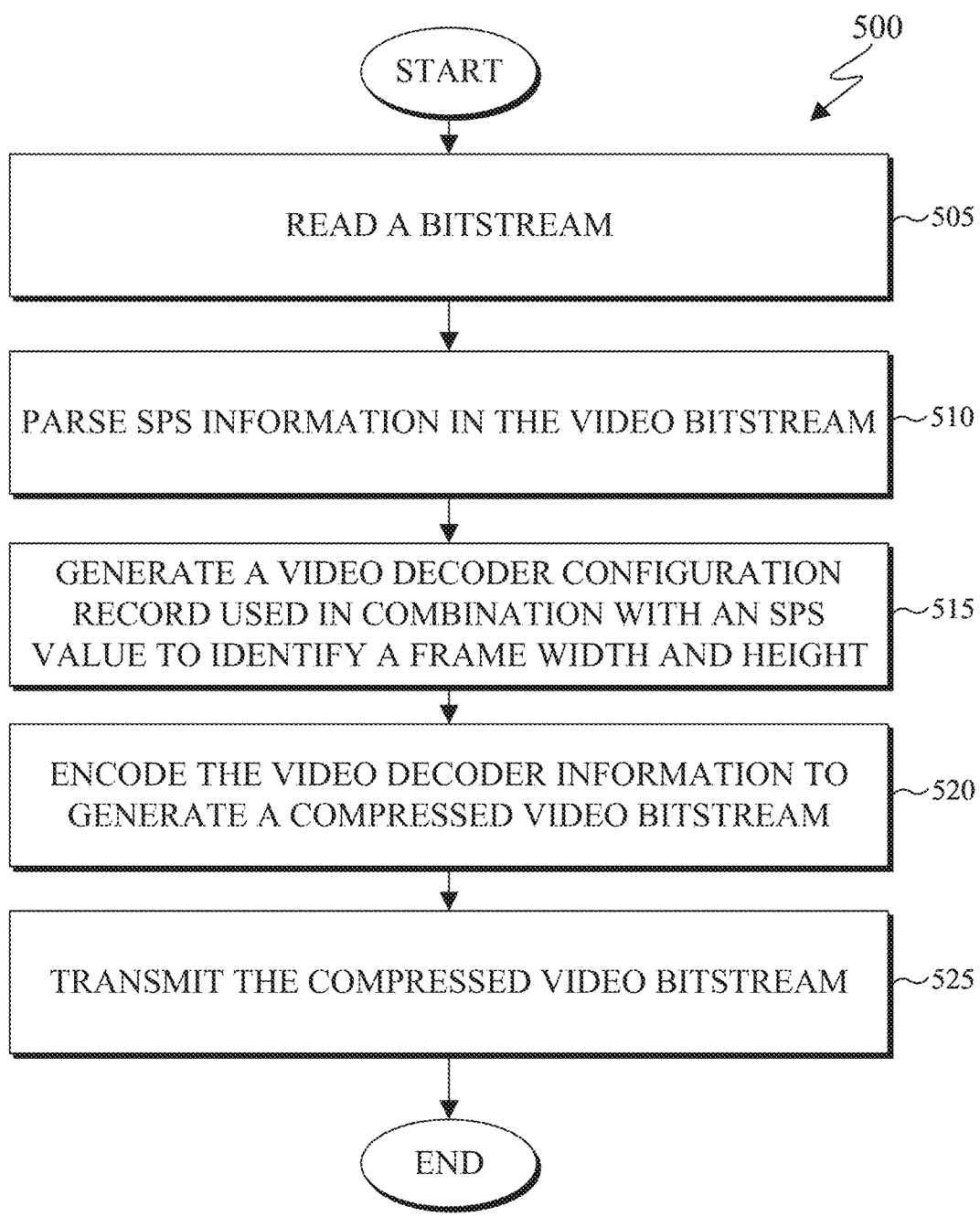
FIG. 5 illustrates an example method of an encoder for storage of EVC decoder configuration information in accordance with an embodiment of this disclosure.

FIG. 5 illustrate example method 500 for storage of EVC decoder configuration information in accordance with an embodiment of this disclosure The method 500 can be performed by the server 104 or any of the client devices 106-116 of FIG. 1, the server 200 of FIG. 2, the electronic device 300 of FIG. 3, the encoder 410 of FIG. 4, or any other suitable device or system. For ease of explanation, the method 500 is described as being performed by the encoder 410 of FIG. 4.

In step 505, the encoder 410 reads a bitstream. The bitstream can include a series of images or one or more videos. The bitstream can be read from a storage device 215, such as a memory 230 or persistent storage 235. The bitstream can also be stored and received from an external source, such as an external server 104. The encoder 410 can receive a request from the decoder 450 to request and identify a specific bitstream.

In step 510, the encoder 410 can parse SPS information in the video bitstream. The SPS information applies to a sequence of consecutive coded video pictures called a coded video sequence. SPS can be used to signal infrequently changing parameters for the video pictures in the bitstream. The SPS information can include width value and height value of each frame within the bitstream.

In step 515, the encoder 410 can generate a video decoder configuration record used in combination with an SPS value to identify a frame width and height. In particular, the encoder 410 determines a maximum width value and a maximum height value for the video stream. When the SPS values for all the video images can be determined by the encoder 410, the maximum width value and maximum height value are stored as variable in decoder configuration information.

The decoder configuration information also includes an SPS_in_stream variable for communicating the image size in combination with the maximum width value and the maximum height value. The maximum width value and the maximum height value set to zero means that a maximum frame size cannot be determined by the encoder or that the values are included in the SPS information in the bitstream. The maximum width value and the maximum height value set to 'O' indicates to check the SPS_in_stream variable for a maximum size of the video frames. The SPS_in_stream variable is set to one to indicate that the largest value is signaled in the SPS in the bitstream. The SPS_in_stream variable is set to 0 to indicate that the largest value of the video frames is not included.

The encoder 410 can identify whether the maximum width value and the maximum width value can be determined at a creation of a file. Based on that determination, the maximum width value and the maximum height value can be entered. When a size is varying over time due to live encoding, the encoder 410 determines that a maximum width value and a maximum height value cannot be determined at the creation of a file. The encoder 410 can set a value of one for the SPS_in_stream value.

In step 520, the encoder 410 can encode the video decoder configuration information to generate a compressed video decoder information. The video decoder configuration information can include metadata that a decoder 450 can use to decode the compressed video bitstream. The video frames in the video bitstream can be encoded using the maximum width and maximum height for a video frame.

In step 525, the encoder 410 transmits the compressed video bitstream. The compressed video bitstream including the video decoder information is transmitted to a decoder 450. The encoder 410 can also transmit the compressed video bitstream to a server 104 for storing and distributing a compressed video stream.

Although FIG. 5 illustrates one example of a method 500 for storage of EVC decoder configuration information, various changes may be made to FIG. 5. For example, while shown as a series of steps, various steps in FIG. 5 could overlap, occur in parallel, or occur any number of times.

Figure 6:
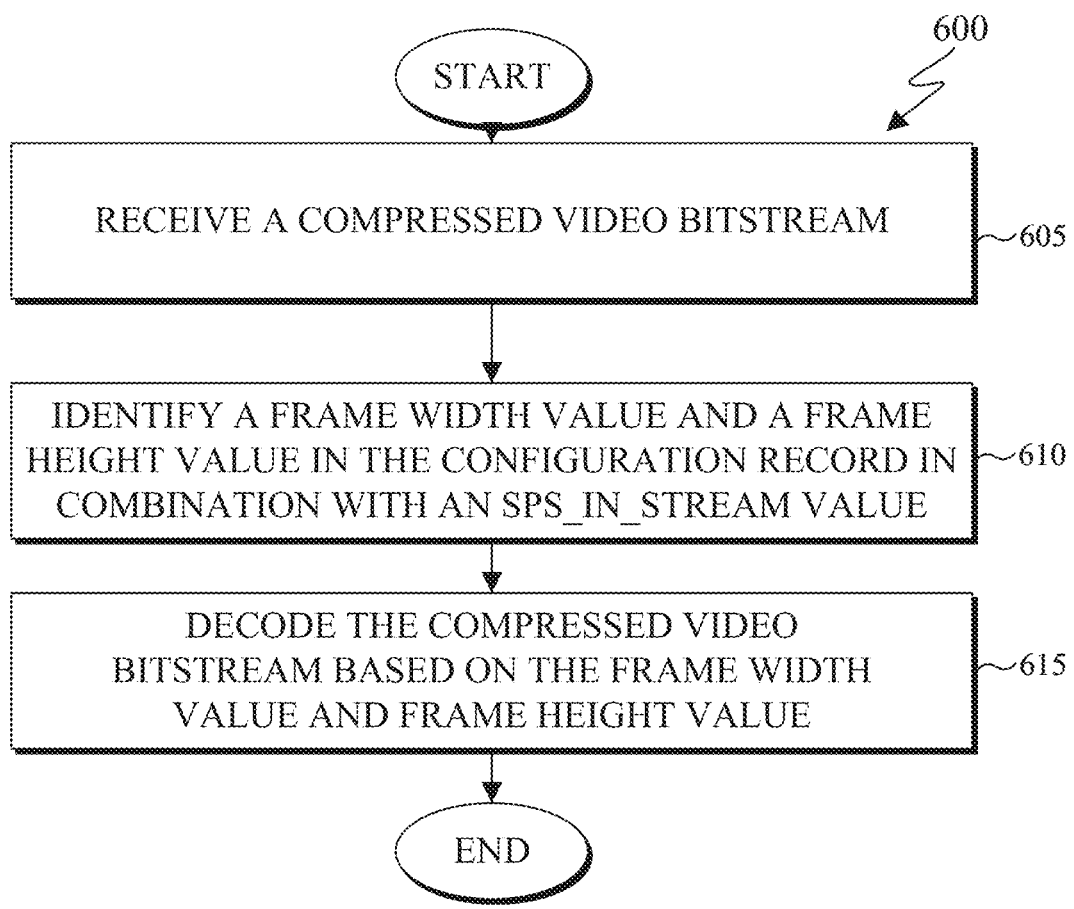
FIG. 6 illustrates an example method of a decoder for storage of EVC decoder configuration information in accordance with an embodiment of this disclosure.

FIG. 6 illustrate example method 600 for storage of EVC decoder configuration information in accordance with an embodiment of this disclosure. The method 600 can be performed by the server 104 or any of the client devices 106-116 of FIG. 1, the server 200 of FIG. 2, the electronic device 300 of FIG. 3, the decoder 450 of FIG. 4, or any other suitable device or system. For ease of explanation, the method 500 is described as being performed by the decoder 450 of FIG. 4.

In step 605, the decoder 450 receives a compressed video bitstream. The compressed video bitstream can be received from an encoder, such as encoder 410 shown in FIG. 4. The compressed video bitstream can have metadata including a video decoder configuration record.

In step 610, the decoder 450 can identify a frame width value and a frame height value in the configuration record in combination with an SPS_in_stream value. The frame width value and the frame height value indicate a maximum frame size for the video frames in the compressed video bitstream. When the frame width value and the frame height value are zero, the SPS_in_stream value is identified to determine whether the maximum size can be determined by the SPS values in the bitstream. When the SPS_in_stream value is one, the maximum frame size can be identified in a SPS value of the bitstream. When the SPS_in_stream value is zero, the maximum frame size cannot be predetermined.

In step 615, the decoder 450 can decode the compressed video bitstream based on the frame width value and the frame height value. The video frames of the compressed video bitstream are decoded based on the maximum size of a video frame determined from the frame width value and the frame height value. The decoded video bitstream can be stored or displayed on the decoder 450.

Although FIG. 6 illustrates one example of a method 600 for storage of EVC decoder configuration information, various changes may be made to FIG. 6. For example, while shown as a series of steps, various steps in FIG. 6 could overlap, occur in parallel, or occur any number of times.

Figure 7:
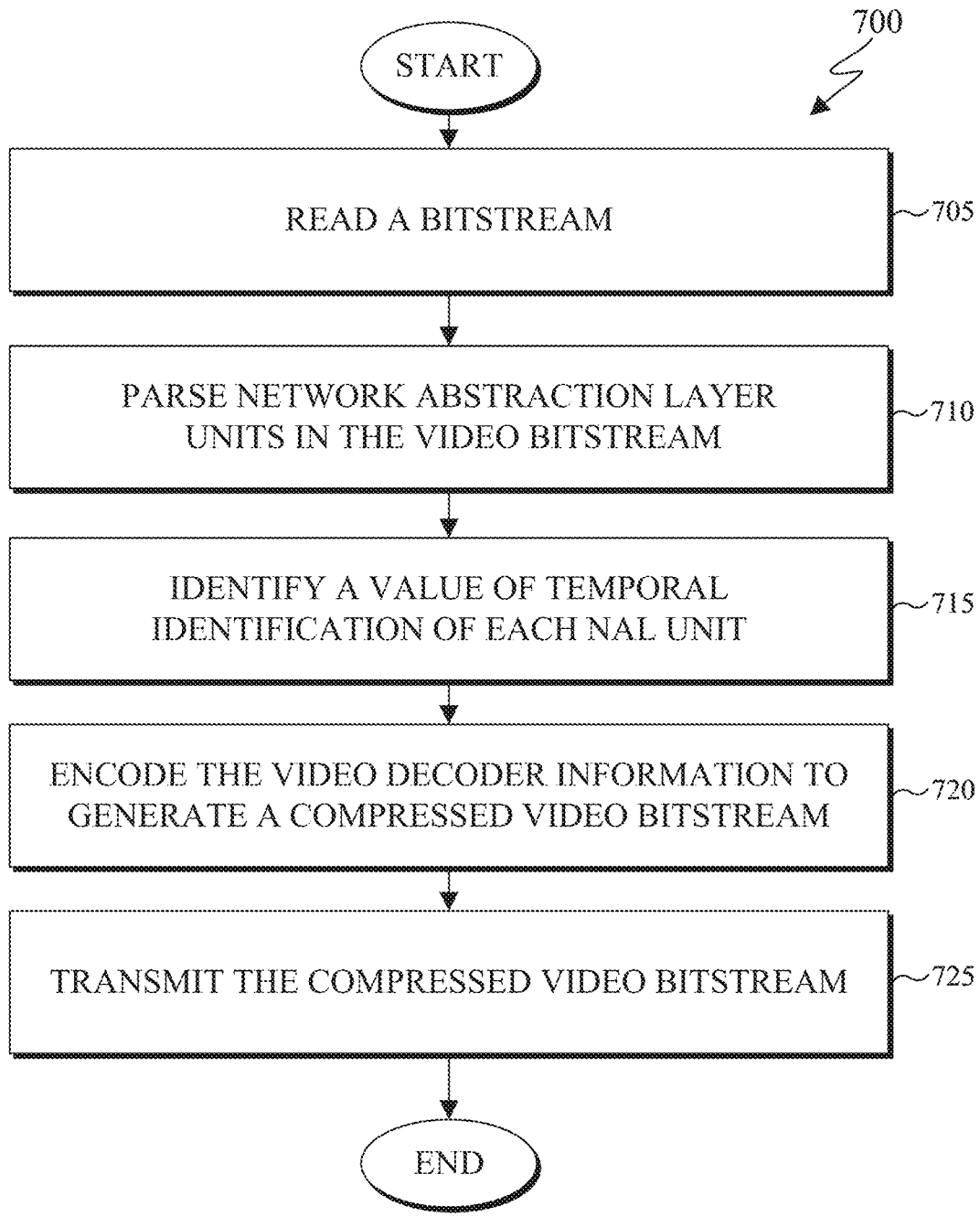
FIG. 7 illustrates an example method of an encoder for storage of EVC decoder configuration information in accordance with an embodiment of this disclosure.

FIG. 7 illustrate example method 700 for storage of EVC decoder configuration information in accordance with an embodiment of this disclosure The method 700 can be performed by the server 104 or any of the client devices 106-116 of FIG. 1, the server 200 of FIG. 2, the electronic device 300 of FIG. 3, the encoder 410 of FIG. 4, or any other suitable device or system. For ease of explanation, the method 700 is described as being performed by the encoder 410 of FIG. 4.

In step 705, the encoder 410 reads a bitstream. The bitstream can include a series of images or one or more videos. The bitstream can be read from a storage device 215, such as a memory 230 or persistent storage 235. The bitstream can be stored and received from an external source, such as an external server 104. The encoder 410 can receive a request from the decoder 450 to request and identify a specific bitstream.

In step 710, the encoder 410 can parse network abstraction layer (NAL) units in the video bitstream. NAL units are organized coded video data. A sub-sample information box has a flag value for indicating the sub-group type. A flag of zero indicates NAL-unit-based sub-samples. A flag of one indicates tile-based sub-samples. A flag of two indicates slice-based sub-samples. A flag of three indicates a temporal ID-based sub-sample.

In step 715, the encoder 410 can identify a value of temporal identification of each NAL unit. Each NAL unit has a temporal ID. When the flag indicates a three, the NAL units are organized based on a temporal ID.

In step 720, the encoder 410 can encode sub-samples according to the value of the temporal ID for each NAL unit to generate a compressed video bitstream. The NAL units are grouped into sub-samples based on NAL units with matching temporal IDs. The sub-sample is a part of the video frame. For example, if the video frame is a person, a sub-sample could be a hand.

In step 725, the encoder 410 transmits the compressed video bitstream. The compressed video bitstream including the sub-samples is transmitted to a decoder 450. The encoder 410 can also transmit the compressed video bitstream to a server 104 for storing and distributing a compressed video stream.

Although FIG. 7 illustrates one example of a method 700 for storage of EVC decoder configuration information, various changes may be made to FIG. 7. For example, while shown as a series of steps, various steps in FIG. 7 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined by the claims. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A video decoding device comprising:
  a communication interface configured to receive a compressed video bitstream including a decoder configuration record; and
  a processor operably coupled to the communication interface, the processor configured to:
    determine, based on a frame width value and a frame height value in the decoder configuration record, whether largest values for a frame width and a frame height for the compressed video bitstream are indicated by the frame width value and frame height value in the decoder configuration record;
    when the largest values for the frame width and the frame height are indicated by the frame width value and the frame height value in the decoder configuration record, decode the compressed video bitstream based on the frame width value and the frame height value in the decoder configuration record; and
    when the largest values for the frame width and the frame height are not indicated by the frame width value and the frame height value in the decoder configuration record:
      determine, based on a sequence parameter set (SPS)_in_stream value in the decoder configuration record, whether an SPS stored in a file for the compressed video bitstream indicates the largest values of the frame width and the frame height and whether the compressed video bitstream contains an additional SPS, wherein the SPS is included in an array of network abstraction layer (NAL) units of the decoder configuration record and the additional SPS is not included in the array of NAL units of the decoder configuration record;
      when the compressed video bitstream contains the additional SPS that is not included in the array of NAL units of the decoder configuration record, determine a frame width value and a frame height value from the additional SPS; and
      decode the compressed video bitstream based on the frame width value and the frame height value from the additional SPS.

2. The video decoding device of claim 1, wherein non-zero values for the frame width value and the frame height value in the decoder configuration record indicate that the largest values for the frame width and the frame height are indicated by the frame width value and the frame height value in the decoder configuration record.

3. The video decoding device of claim 1, wherein the processor is configured to decode the compressed video bitstream based on the frame width value and the frame height value in the decoder configuration record regardless of the SPS_in_stream value when the largest values for the frame width and the frame height are indicated by the frame width value and the frame height value in the decoder configuration record.

4. The video decoding device of claim 1, wherein zero values for the frame width value and the frame height value in the decoder configuration record indicate that the largest values for the frame width and the frame height are not indicated by the frame width value and the frame height value in the decoder configuration record.

5. The video decoding device of claim 1, wherein the SPS_in_stream value set to one indicates that the compressed video bitstream contains the additional SPS that is not included in the array of NAL units of the decoder configuration record.

6. The video decoding device of claim 1, wherein the SPS_in_stream value set to zero indicates the compressed video bitstream does not contain the additional SPS that is not included in the array of NAL units of the decoder configuration record.

7. The video decoding device of claim 6, wherein the SPS_in_stream value set to zero indicates that the largest values of the frame width and the frame height are indicated by the SPS stored in metadata part of the file for the compressed video bitstream.

8. A method performed by a video decoding device, the method comprising:

receiving a compressed video bitstream including a decoder configuration record;

determining, based on a frame width value and a frame height value in the decoder configuration record, whether largest values for a frame width and a frame height for the compressed video bitstream are indicated by the frame width value and frame height value in the decoder configuration record;

when the largest values for the frame width and the frame height are indicated by the frame width value and the frame height value in the decoder configuration record, decoding the compressed video bitstream based on the frame width value and the frame height value in the decoder configuration record; and when the largest values for the frame width and the frame height are not indicated by the frame width value and the frame height value in the decoder configuration record:

determining, based on a sequence parameter set (SPS)_in_stream value in the decoder configuration record, whether an SPS stored in a file for the compressed video bitstream indicates the largest values of the frame width and the frame height and whether the compressed video bitstream contains an additional SPS, wherein the SPS is included in an array of network abstraction layer (NAL) units of the decoder configuration record and the additional SPS is not include in the array of NAL units of the decoder configuration record;

when the compressed video bitstream contains the additional SPS that is not included in the array of NAL units of the decoder configuration record, determining a frame width value and a frame height value from the additional SPS; and decoding the compressed video bitstream based on the frame width value and the frame height value from the additional SPS.

9. The method of claim 8, wherein non-zero values for the frame width value and the frame height value in the decoder configuration record indicate that the largest values for the frame width and the frame height are indicated by the frame width value and the frame height value in the decoder configuration record.

10. The method of claim 8, wherein decoding the compressed video bitstream comprises decoding the compressed video bitstream based on the frame width value and the frame height value in the decoder configuration record regardless of the SPS_in_stream value when the largest values for the frame width and the frame height are indicated by the frame width value and the frame height value in the decoder configuration record.

11. The method of claim 8, wherein zero values for the frame width value and the frame height value in the decoder configuration record indicate that the largest values for the frame width and the frame height are not indicated by the frame width value and the frame height value in the decoder configuration record.

12. The method of claim 8, wherein the SPS_in_stream value set to one indicates that the compressed video bitstream contains the additional SPS that is not included in the array of NAL units of the decoder configuration record.

13. The method of claim 8, wherein the SPS_in_stream value set to zero indicates the compressed video bitstream does not contain the additional SPS that is not included in the array of NAL units of the decoder configuration record.

14. The method of claim 13, wherein the SPS_in_stream value set to zero indicates that the largest values of the frame width and the frame height are indicated by the SPS stored in metadata part of the file for the compressed video bitstream.

15. A non-transitory, computer-readable medium comprising program code that, when executed by a processor of a video decoding device, causes the video decoding device to:

receive a compressed video bitstream including a decoder configuration record;

determine, based on a frame width value and a frame height value in the decoder configuration record, whether largest values for a frame width and a frame height for the compressed video bitstream are indicated by the frame width value and frame height value in the decoder configuration record;

when the largest values for the frame width and the frame height are indicated by the frame width value and the frame height value in the decoder configuration record, decode the compressed video bitstream based on the frame width value and the frame height value in the decoder configuration record; and when the largest values for the frame width and the frame height are not indicated by the frame width value and the frame height value in the decoder configuration record:

determine, based on a sequence parameter set (SPS)_in_stream value in the decoder configuration record, whether an SPS stored in a file for the compressed video bitstream indicates the largest values of the frame width and the frame height and whether the compressed video bitstream contains an additional SPS, wherein the SPS is included in an array of network abstraction layer (NAL) units of the decoder configuration record and the additional SPS is not include in the array of NAL units of the decoder configuration record;

when the compressed video bitstream contains the additional SPS that is not included in the array of NAL units of the decoder configuration record, determine a frame width value and a frame height value from the additional SPS; and decode the compressed video bitstream based on the frame width value and the frame height value from the additional SPS.

16. The non-transitory, computer-readable medium of claim 15, wherein non-zero values for the frame width value and the frame height value in the decoder configuration record indicate that the largest values for the frame width and the frame height are indicated by the frame width value and the frame height value in the decoder configuration record.

17. The non-transitory, computer-readable medium of claim 15, wherein the program code that, when executed by the processor, causes the video decoding device to decode the compressed video bitstream comprises program code that, when executed by the processor, causes the video decoding device to decode the compressed video bitstream based on the frame width value and the frame height value in the decoder configuration record regardless of the SPS_in_stream value when the largest values for the frame width and the frame height are indicated by the frame width value and the frame height value in the decoder configuration record.

18. The non-transitory, computer-readable medium of claim 15, wherein zero values for the frame width value and the frame height value in the decoder configuration record indicate that the largest values for the frame width and the frame height are not indicated by the frame width value and the frame height value in the decoder configuration record.

19. The non-transitory, computer-readable medium of claim 15, wherein the SPS_in_stream value set to one indicates that the compressed video bitstream contains the additional SPS that is not included in the array of NAL units of the decoder configuration record.

20. The non-transitory, computer-readable medium of claim 15, wherein:
   the SPS_in_stream value set to zero indicates the compressed video bitstream does not contain the additional SPS that is not included in the array of NAL units of the decoder configuration record, and
   the SPS_in_stream value set to zero indicates that the largest values of the frame width and the frame height are indicated by the SPS stored in metadata part of the file for the compressed video bitstream.

* * * * *